United States Patent
Sasaki et al.

(10) Patent No.: US 9,752,027 B2
(45) Date of Patent: Sep. 5, 2017

(54) THERMOPLASTIC ELASTOMER COMPOSITION AND MOLDED BODY

(71) Applicants: KURARAY CO., LTD., Kurashiki-shi (JP); AMYRIS, INC., Emeryville, CA (US)

(72) Inventors: Hiromitsu Sasaki, Kamisu (JP); Yosuke Uehara, Kamisu (JP); Masahiro Kato, Kamisu (JP)

(73) Assignees: KURARAY CO., LTD., Kurashiki-shi (JP); AMYRIS, INC., Emeryville, CA (US)

( * ) Notice: Subject to any disclaimer, the term of this patent is extended or adjusted under 35 U.S.C. 154(b) by 0 days.

(21) Appl. No.: 14/787,923

(22) PCT Filed: Sep. 29, 2014

(86) PCT No.: PCT/JP2014/075928
§ 371 (c)(1),
(2) Date: Oct. 29, 2015

(87) PCT Pub. No.: WO2015/046524
PCT Pub. Date: Apr. 2, 2015

(65) Prior Publication Data
US 2016/0108228 A1    Apr. 21, 2016

(30) Foreign Application Priority Data

Sep. 30, 2013 (JP) ................... 2013-205560

(51) Int. Cl.
| | | |
|---|---|---|
| *C08L 53/02* | (2006.01) | |
| *C08F 8/04* | (2006.01) | |
| *C08F 297/04* | (2006.01) | |
| *C08K 5/01* | (2006.01) | |

(52) U.S. Cl.
CPC ............... *C08L 53/02* (2013.01); *C08F 8/04* (2013.01); *C08F 297/04* (2013.01); *C08K 5/01* (2013.01); *C08L 53/025* (2013.01); *C08F 2800/20* (2013.01)

(58) Field of Classification Search
CPC ........ C08L 53/02; C08L 53/025; C08L 23/02; C08K 5/01; C08F 8/04; C08F 297/04
See application file for complete search history.

(56) References Cited

U.S. PATENT DOCUMENTS

| | | | |
|---|---|---|---|
| 7,655,739 B1 | 2/2010 | McPhee et al. | |
| 7,759,444 B1 | 7/2010 | McPhee | |
| 2002/0147274 A1 | 10/2002 | Sasagawa et al. | |
| 2004/0132907 A1* | 7/2004 | Nakamura | C08F 297/04 525/88 |
| 2004/0137177 A1* | 7/2004 | Saito | A61J 1/2093 428/35.2 |
| 2004/0176524 A1* | 9/2004 | Ikuji | C08K 5/14 524/505 |
| 2005/0043485 A1* | 2/2005 | Lee | C08L 23/16 525/191 |
| 2005/0154148 A1* | 7/2005 | Nakamichi | C08L 67/04 525/450 |
| 2006/0178485 A1* | 8/2006 | Shimakage | C08F 8/04 525/242 |
| 2010/0331800 A1* | 12/2010 | McPhee | A61L 15/58 604/366 |
| 2012/0165474 A1 | 6/2012 | McPhee et al. | |
| 2012/0244304 A1 | 9/2012 | McPhee | |
| 2013/0123379 A1 | 5/2013 | McPhee | |
| 2015/0031839 A1 | 1/2015 | Washizu | |

FOREIGN PATENT DOCUMENTS

| | | |
|---|---|---|
| JP | 6-293853 A | 10/1994 |
| JP | 7-506614 A | 7/1995 |
| JP | 2001-151979 A | 6/2001 |
| JP | 2006-225580 A | 8/2006 |
| JP | 2008-533245 A | 8/2006 |
| JP | 2006-249269 A | 9/2006 |
| JP | 2012-502135 A | 1/2012 |
| JP | 2012-502136 A | 1/2012 |
| JP | 2013-532767 A | 8/2013 |
| TW | I287561 B | 10/2007 |
| WO | WO 2010/024382 A1 | 3/2010 |
| WO | WO 2013/126129 A1 | 8/2013 |
| WO | WO 2013/132905 A1 | 9/2013 |
| WO | WO 2013/183570 A1 | 12/2013 |
| WO | WO 2014/142001 A1 | 9/2014 |
| WO | WO 2014/156651 A1 | 10/2014 |

OTHER PUBLICATIONS

Speight, J.G.; Handbook of Petroleum Product Analysis, $2^{th}$ ed., 2015, p. 207.*
Ash, M., et al.; Handbook of Fillers, Extenders, and Diluents, $2^{nd}$ ed., 2007, p. 299.*
Combined Taiwanese Office Action and Search Report issued Nov. 17, 2015 in Patent Application No. 103133849 (with English translation of categories of cited documents).
International Search Report issued Dec. 2, 2014, in PCT/JP2014/075928 filed Sep. 29, 2014.

* cited by examiner

*Primary Examiner* — Robert Jones, Jr.
(74) *Attorney, Agent, or Firm* — Oblon, McClelland, Maier & Neustadt, L.L.P.

(57) ABSTRACT

The thermoplastic elastomer composition of the present invention is a thermoplastic elastomer composition including a hydrogenated block copolymer (A) and a softening agent (B), the hydrogenated block copolymer (A) being a hydrogenated product of a block copolymer including a polymer block (a) composed of a constitutional unit derived from an aromatic vinyl compound and a polymer block (b) containing 1 to 100% by mass of a constitutional unit (b1) derived from farnesene and 99 to 0% by mass of a constitutional unit (b2) derived from a conjugated diene other than farnesene; a mass ratio of the polymer block (a) and the polymer block (b) [(a)/(b)] being 1/99 to 70/30; 50 mol % or more of carbon-carbon double bonds in the polymer block (b) being hydrogenated; and a content of the softening agent (B) being 20 to 2,000 parts by mass on the basis of 100 parts by mass of the hydrogenated block copolymer (A).

10 Claims, No Drawings ic elastomer composition and molded body

TECHNICAL FIELD

The present invention relates to a thermoplastic elastomer composition including a hydrogenated block copolymer containing a monomer unit derived from an aromatic vinyl compound and a softening agent and to a molded body including the thermoplastic elastomer composition.

BACKGROUND ART

Thermoplastic elastomer compositions are generally excellent in chemical resistance and mechanical properties and are used in wide areas including mechanical components, automobile components, household articles, various containers, and the like.

For example, PTL 1 describes a gel composition including two kinds of styrene-based elastomers and a softening agent, as a composition having excellent impact absorbing properties.

PTL 2 describes a composition in which a block copolymer having a block constituted of a vinyl aromatic compound and a block composed of isoprene and butadiene, or a hydrogenated product thereof, is compounded with a softening agent and a tackifier resin, as a composition having a low hardness and excellent impact absorption properties.

PTL 3 describes a composition including a hydrogenated product of a block copolymer having a block composed of a vinyl aromatic compound and a block composed of a conjugated diene compound, a polypropylene-based resin, and a non-aromatic rubber softening agent, as a thermoplastic elastomer composition having excellent molding processability, flexibility, and rubber elasticity.

PTL 4 describes a gel composition including a styrene-(ethylene/propylene)-styrene block copolymer and an extender liquid.

PTL 5 describes a thermoplastic elastomer composition including a hydrogenated block copolymer having an aromatic vinyl compound content of 40 to 70 weight %, a hydrogenated block copolymer having an aromatic vinyl compound content of less than 40 weight %, and a non-aromatic rubber softening agent.

PTL 6 describes an oil gel composition including a hydrogenated styrene/butadiene block copolymer and a non-aromatic ester oil.

PTL 7 describes a thermoplastic elastomer composition including an isoprene/butadiene-styrene block copolymer and a non-aromatic rubber softening agent.

Incidentally, though PTLs 8 and 9 describe a polymer of β-farnesene, practically useful physical properties thereof are not sufficiently studied.

CITATION LIST

Patent Literature

PTL 1: JP 2001-151979A
PTL 2: JP H06-293853A
PTL 3: JP 2006-249269A
PTL 4: JP H07-506614A
PTL 5: JP 2006-225580A
PTL 6: JP 2008-533245A
PTL 7: WO2010/024382A
PTL 8: JP 2012-502135A
PTL 9: JP 2012-502136A

SUMMARY OF INVENTION

Technical Problem

Although the thermoplastic elastomer compositions disclosed in PTLs 1 to 7 are excellent in at least one of flexibility, molding processability, weather resistance, and rubber elasticity, they are still insufficient.

Then, an object of the present invention is to provide a thermoplastic elastomer composition that is excellent in all of flexibility, molding processability, weather resistance, and rubber elasticity and a molded body including the thermoplastic elastomer composition.

Solution to Problem

Specifically, the present invention is concerned with:
[1] A thermoplastic elastomer composition including a hydrogenated block copolymer (A) and a softening agent (B),
the hydrogenated block copolymer (A) being a hydrogenated product of a block copolymer including a polymer block (a) composed of a constitutional unit derived from an aromatic vinyl compound and a polymer block (b) containing 1 to 100% by mass of a constitutional unit (b1) derived from farnesene and 99 to 0% by mass of a constitutional unit (b2) derived from a conjugated diene other than farnesene,
a mass ratio of the polymer block (a) and the polymer block (b) [(a)/(b)] being 1/99 to 70/30,
50 mol % or more of carbon-carbon double bonds in the polymer block (b) being hydrogenated, and
a content of the softening agent (B) being 20 to 2,000 parts by mass on the basis of 100 parts by mass of the hydrogenated block copolymer (A); and
[2] A molded body including the aforementioned thermoplastic elastomer composition.

Advantageous Effects of Invention

In accordance with the present invention, it is possible to provide a thermoplastic elastomer composition that is excellent in all of flexibility, molding processability, weather resistance, and rubber elasticity and a molded body including the thermoplastic elastomer composition.

DESCRIPTION OF EMBODIMENTS

[1] Thermoplastic Elastomer Composition

The thermoplastic elastomer composition of the present invention is a thermoplastic elastomer composition including a hydrogenated block copolymer (A) and a softening agent (B),
the hydrogenated block copolymer (A) being a hydrogenated product of a block copolymer including a polymer block (a) composed of a constitutional unit derived from an aromatic vinyl compound and a polymer block (b) containing 1 to 100% by mass of a constitutional unit (b1) derived from farnesene and 99 to 0% by mass of a constitutional unit (b2) derived from a conjugated diene other than farnesene,
a mass ratio of the polymer block (a) and the polymer block (b) [(a)/(b)] being 1/99 to 70/30,
50 mol % or more of carbon-carbon double bonds in the polymer block (b) being hydrogenated, and
a content of the softening agent (B) being 20 to 2,000 parts by mass on the basis of 100 parts by mass of the hydrogenated block copolymer (A).

In view of the fact that the thermoplastic elastomer composition of the present invention uses the hydrogenated block copolymer (A) having the constitutional unit (b1) derived from farnesene as the hydrogenated block copolymer, as compared with the case of using other hydrogenated block copolymers, thorough flexibility can be obtained in a smaller content of the softening agent, and in addition, the rubber elasticity can be improved because the content of the hydrogenated block copolymer (A) can be relatively increased. In addition, the thermoplastic elastomer composition of the present invention is also excellent in molding processability and weather resistance because it uses the hydrogenated block copolymer (A).

[Hydrogenated Block Copolymer (A)]

The hydrogenated block copolymer (A) is a hydrogenated product of a block copolymer (hereinafter also referred to as "block copolymer (P)") including a polymer block (a) composed of a constitutional unit derived from an aromatic vinyl compound and a polymer block (b) containing 1 to 100% by mass of a constitutional unit (31) derived from farnesene and 99 to 0% by mass of a constitutional unit (b2) derived from a conjugated diene other than farnesene in a mass ratio of the polymer block (a) and the polymer block (b) [(a)/(b)] of 1/99 to 70/30 (the hydrogenated product will be hereinafter also referred to as "hydrogenated block copolymer (A)"), in which 50 mol % or more of carbon-carbon double bonds in the polymer block (b) is hydrogenated.

The polymer block (a) is constituted of a constitutional unit derived from an aromatic vinyl compound. Examples of such an aromatic vinyl compound include styrene, α-methylstyrene, 2-methylstyrene, 3-methylstyrene, 4-methylstyrene, 4-propylstyrene, 4-t-butylstyrene, 4-cyclohexylstyrene, 4-dodecylstyrene, 2,4-dimethylstyrene, 2,4-diisopropylstyrene, 2,4,6-trimethylstyrene, 2-ethyl-4-benzylstyrene, 4-(phenylbutyl)styrene, 1-vinylnaphthalene, 2-vinylnaphthalene, vinylanthracene, N,N-diethyl-4-aminoethylstyrene, vinylpyridine, 4-methoxystyrene, monochlorostyrene, dichlorostyrene, divinylbenzene, and the like. These aromatic vinyl compounds may be used alone or in combination of any two or more thereof. Of those, styrene, α-methylstyrene, and 4-methylstyrene are more preferred, and styrene is still more preferred.

The polymer block (b) contains 1 to 100% by mass of the constitutional unit (b1) derived from farnesene and contains 99 to 0% by mass of the constitutional unit (b2) derived from a conjugated diene other than farnesene. Although the constitutional unit (b1) may be a constitutional unit derived from α-farnesene or β-farnesene represented by the following formula (I), the constitutional unit (b1) is preferably a constitutional unit derived from β-farnesene from the viewpoint of facilitating production of the block copolymer (P). Incidentally, α-farnesene and β-farnesene may be used in combination.

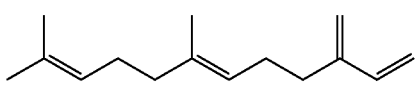

(I)

Examples of the conjugated diene constituting the constitutional unit (b2) derived from a conjugated diene other than farnesene include butadiene, isoprene, 2,3-dimethylbutadiene, 2-phenylbutadiene, 1,3-pentadiene, 2-methyl-1,3-pentadiene, 1,3-hexadiene, 1,3-octadiene, 1,3-cyclohexadiene, 2-methyl-1,3-octadiene, 1,3,7-octatriene, myrcene, chloroprene, and the like. These conjugated dienes may be used alone or in combination of any two or more thereof. Of those, butadiene, isoprene, and myrcene are more preferred, and one kind or two kinds of butadiene and isoprene are still more preferred.

The polymer block (b) contains 1 to 100% by mass of the constitutional unit (b1) derived from farnesene and contains 99 to 0% by mass of the constitutional unit (b2) derived from a conjugated diene other than farnesene. Incidentally, it is meant by the terms "contains 0% by mass of the constitutional unit (b2) derived from a conjugated diene" that the polymer block (b) does not contain the constitutional unit (b2) derived from a conjugated diene. When the content of the constitutional unit (b1) derived from farnesene is less than 1% by mass, a thermoplastic elastomer composition that is excellent in all of flexibility, molding processability, weather resistance, and rubber elasticity cannot be obtained. The content of the constitutional unit (b1) in the polymer block (b) is preferably 30 to 100% by mass, and more preferably 45 to 100% by mass. In addition, in the case where the polymer block (b) contains the constitutional unit (b2) derived from a conjugated diene other than farnesene, the content of the constitutional unit (b2) is preferably 70% by mass or less, and more preferably 55% by mass or less.

The polymer block (b) may contain a constitutional unit other than the constitutional units (b1) and (b2) within the range where the effects of the present invention are not hindered; however, it is preferred that the polymer block (b) does not contain such other constitutional unit. A total amount of the constitutional unit (b1) and the constitutional unit (b2) in the polymer block (b) is preferably 95% by mass or more, and more preferably 100% by mass.

The hydrogenated block copolymer (A) is a hydrogenated product of the block copolymer (P) including at least one of each of the polymer block (a) and the polymer block (b). This hydrogenated product of the block copolymer (P) is preferably a hydrogenated product of the block copolymer (P) including two or more of the polymer block (a) and one or more of the polymer block (b).

A bonding configuration of each of the polymer block (a) and the polymer block (b) is not particularly limited, and may be any one of a linear configuration, a branched configuration, a radial configuration, or a combination of any two or more of these configurations. Above all, a configuration in which the respective blocks are bonded in a linear configuration is preferred. When the polymer block (a) and the polymer block (b) are represented by a and b, respectively, a bonding configuration represented by (a-b)$_l$, a-(b-a)$_m$, or b-(a-b)$_n$ is preferred. Incidentally, each of l, m, and n independently represents an integer of 1 or more.

As for the bonding configuration, a triblock copolymer represented by a-b-a is preferred from the viewpoints of flexibility, molding processability, weather resistance, rubber elasticity, handling properties, and the like.

In addition, in the case where the block copolymer (P) has two or more of the polymer block (a) or two or more of the polymer block (b), each of the polymer blocks may be either a polymer block composed of the same constitutional unit or a polymer block composed of different kinds of constitutional units. For example, in the two polymer blocks (a) in the triblock copolymer represented by [a-b-a], the respective aromatic vinyl compounds may be constituted of either the same kind of compound or different kinds of compounds.

A mass ratio of the polymer block (a) and the polymer block (b) [(a)/(b)] is 1/99 to 70/30. When the mass ratio falls outside the foregoing range, a thermoplastic elastomer composition that is excellent in all of flexibility, molding processability, weather resistance, and rubber elasticity cannot be obtained. From those viewpoints, the mass ratio of the polymer block (a) and the polymer block (b) [(a)/(b)] is preferably 10/90 to 70/30, more preferably 10/90 to 60/40, still more preferably 15/85 to 55/45, and most preferably 15/85 to 50/50.

A peak top molecular weight (Mp) of the hydrogenated block copolymer (A) is preferably 4,000 to 1,500,000, more preferably 9,000 to 1,200,000, and still more preferably 50,000 to 1,000,000 from the viewpoint of molding processability. In addition, the peak top molecular weight (Mp) is yet still more preferably 170,000 to 800,000, and especially preferably 195,000 to 600,000 from the viewpoints of flexibility and rubber elasticity at especially high temperatures.

Incidentally, the peak top molecular weight (Mp) in the present specification means a value measured by the method described in Examples as described later.

A molecular weight distribution (Mw/Mn) of the hydrogenated block copolymer (A) is preferably 1 to 4, more preferably 1 to 3, and still more preferably 1 to 2. So far as the molecular weight distribution falls within the foregoing range, a scattering in a viscosity of the hydrogenated block copolymer (A) is small, and the handling is easy.

The block copolymer (P) may include, in addition to the polymer block (a) and the polymer block (b) as described above, a polymer block (c) constituted of other monomer, so long as the effects of the present invention are not hindered.

Examples of such other monomer include unsaturated hydrocarbon compounds, such as propylene, 1-butene, 1-pentene, 4-methyl-1-pentene, 1-hexene, 1-octene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, etc.; functional group-containing unsaturated compounds, such as acrylic acid, methacrylic acid, methyl acrylate, methyl methacrylate, acrylonitrile, methacrylonitrile, maleic acid, fumaric acid, crotonic acid, itaconic acid, 2-acryloylethanesulfonic acid, 2-methacryloylethane sulfonic acid, 2-acrylamide-2-methylpropanesulfonic acid, 2-methacrylamide-2-methylpropanesulfonic acid, vinylsulfonic acid, vinyl acetate, methyl vinyl ether, etc.; and the like. These monomers may be used alone or in combination of any two or more thereof.

In the case where the block copolymer (P) has the polymer block (c), its content is preferably 50% by mass or less, more preferably 40% by mass or less, still more preferably 30% by mass or less, and most preferably 10% by mass or less.

[Production Method of Hydrogenated Block Copolymer (A)]

The hydrogenated block copolymer (A) may be, for example, suitably produced by a polymerization step of obtaining the block copolymer (P) by anionic polymerization; and a step of hydrogenating 50 mol % or more of carbon-carbon double bonds in the polymer block (b) in the block copolymer (P).

<Polymerization Step>

The block copolymer (P) may be produced by a solution polymerization method or methods described in JP 2012-502135A and JP 2012-502136A, or the like. Above all, the solution polymerization method is preferred, and known methods, for example, ionic polymerization methods, such as anionic polymerization, cationic polymerization, etc., a radical polymerization method, and the like are applicable. Above all, the anionic polymerization method is preferred. As for the anionic polymerization method, the aromatic vinyl compound and farnesene and/or the conjugated diene other than farnesene are successively added in the presence of a solvent and an anionic polymerization initiator, and optionally a Lewis base, thereby obtaining the block copolymer (P).

Examples of the anionic polymerization initiator include alkali metals, such as lithium, sodium, potassium, etc.; alkaline earth metals, such as beryllium, magnesium, calcium, strontium, barium, etc.; lanthanoid-based rare earth metals, such as lanthanum, neodymium, etc.; compounds containing the aforementioned alkali metal, alkaline earth metal, or lanthanoid-based rare earth metal; and the like. Above all, alkali metals, compounds containing an alkali metal, and organic alkali metal compounds are preferred.

Examples of such an organic alkali metal compound include organic lithium compounds, such as methyllithium, ethyllithium, n-butyllithium, sec-butyllithium, t-butyllithium, hexyllithium, phenyllithium, stilbenelithium, dilithiomethane, dilithionaphthalene, 1,4-dilithiobutane, 1,4-dilithio-2-ethylcyclohexane, 1,3,5-trilithiobenzene, etc.; sodium naphthalene; potassium naphthalene; and the like. Above all, organic lithium compounds are preferred, n-butyllithium and sec-butyllithium are more preferred, and sec-butyllithium is especially preferred. Incidentally, the organic alkali metal compound may be allowed to react with a secondary amine, such as diisopropylamine, dibutylamine, dihexylamine, dibenzylamine, etc. and used as an organic alkali metal amide.

Although an amount of the organic alkali metal compound that is used for the polymerization varies depending upon a molecular weight of the block copolymer (P), it is typically in the range of from 0.01 to 3% by mass on the basis of a total amount of the aromatic vinyl compound, the farnesene, and the conjugated diene other than farnesene.

The solvent is not particularly limited so long as it does not adversely affect the anionic polymerization reaction, and examples thereof include saturated aliphatic hydrocarbons, such as n-pentane, isopentane, n-hexane, n-heptane, isooctane, etc.; saturated alicyclic hydrocarbons, such as cyclopentane, cyclohexane, methylcyclopentane, etc.; aromatic hydrocarbons, such as benzene, toluene, xylene, etc.; and the like. These solvents may be used alone or in combination of any two or more thereof. An amount of the solvent used is not particularly limited.

The Lewis base acts for controlling a microstructure of each of the constitutional unit derived from farnesene and the constitutional unit derived from a conjugated diene other than farnesene. Examples of such a Lewis base include ether compounds, such as dibutyl ether, diethyl ether, tetrahydrofuran, dioxane, ethylene glycol diethyl ether, etc.; pyridine; tertiary amines, such as N,N,N',N'-tetramethylethylenediamine, trimethylamine, etc.; alkali metal alkoxides, such as potassium t-butoxide, etc.; phosphine compounds; and the like. In the case of using the Lewis base, it is preferred that its amount is typically in the range of from 0.01 to 1,000 mol equivalent on the basis of 1 mol of the anionic polymerization initiator.

A temperature of the polymerization reaction is in the range of typically from −80 to 150° C., preferably from 0 to 100° C., and more preferably from 10 to 90° C. The mode of the polymerization reaction may be either a batchwise mode or a continuous mode. When the aromatic vinyl compound, and the farnesene and/or the conjugated diene other than farnesene is supplied into the polymerization reaction solution in a continuous or intermittent manner such that the abundance ratio of each of the monomers falls within a specified range, or successively polymerizing the respective monomers such that each of the monomers in the polymerization reaction solution becomes a specified ratio, the block copolymer (P) may be produced.

The polymerization reaction may be stopped by adding an alcohol, such as methanol, isopropanol, etc., as a polymerization terminator. The resulting polymerization reaction solution may be poured into a poor solvent, such as methanol, etc., to precipitate the block copolymer (P). Alternatively, when the polymerization reaction solution is rinsed with water, separated, and then dried, the block copolymer (P) may be isolated.

{Modified Copolymer}

In the present polymerization step, the block copolymer (P) in an unmodified form may be obtained as described above; however, by introducing a functional group into the aforementioned block copolymer (P) prior to a hydrogenation step as described later, the block copolymer (P) in a modified form may be obtained. Examples of a functional group that may be introduced include an amino group, an alkoxysilyl group, a hydroxyl group, an epoxy group, a carboxyl group, a carbonyl group, a mercapto group, an isocyanate group, an acid anhydride group, and the like.

Examples of the method of modifying the block copolymer (P) include a method in which before adding the polymerization terminator, a coupling agent capable of reacting with a polymerization-active terminal, such as tin tetrachloride, tetrachlorosilane, dimethyldichlorosilane, dimethyldiethoxysilane, tetramethoxysilane, tetraethoxysilane, 3-aminopropyltriethoxysilane, tetraglycidyl-1,3-bisaminomethylcyclohexane, 2,4-tolylene diisocyanate, etc., a polymerization terminal modifier, such as 4,4'-bis(diethylamino)benzophenone, N-vinylpyrrolidone, etc., or other modifier as described in JP 2011-132298A, is added. In addition, the isolated copolymer may be grafted with maleic anhydride or the like and used.

The site into which the functional group is introduced may be either a polymerization terminal or a side chain of the block copolymer (P). In addition, the functional group may be used alone or in combination of any two or more thereof. It is preferred that the modifier is added in an amount ranging typically from 0.01 to 10 mol equivalent on the basis of the anionic polymerization initiator.

<Hydrogenation Step>

When the block copolymer (P) or the modified block copolymer (P), which is obtained by the aforementioned method, is subjected to a hydrogenation step, the hydrogenated block copolymer (A) can be produced. As the hydrogenation method, known methods may be adopted. For example, a solution prepared by dissolving the block copolymer (P) in a solvent that does not affect the hydrogenation reaction is subjected to hydrogenation reaction in the presence of, as a hydrogenation catalyst, a Ziegler-based catalysts; a metal catalyst obtained by supporting a metal, such as nickel, platinum, palladium, ruthenium, or rhodium, on carbon, silica, diatomaceous earth, or the like; or an organic metal complex containing a metal, such as cobalt, nickel, palladium, rhodium, or ruthenium. In the hydrogenation step, the hydrogenation reaction may be carried out by adding the hydrogenation catalyst to the polymerization reaction solution containing the block copolymer (P) obtained by the aforementioned production method of the block copolymer (P). In the present invention, palladium carbon having palladium supported on carbon is preferred.

In the hydrogenation reaction, a hydrogen pressure is preferably 0.1 to 20 MPa, a reaction temperature is preferably 100 to 200° C., and a reaction time is preferably 1 to 20 hours.

A hydrogenation rate of the carbon-carbon double bonds in the polymer block (b) is 50 to 100 mol %. When the hydrogenation rate falls outside the foregoing range, it is difficult to obtain a thermoplastic elastomer composition that is excellent in flexibility, molding processability, weather resistance, and rubber elasticity. From such viewpoint, the hydrogenation rate is preferably 70 to 100 mol %, more preferably 80 to 100 mol %, and still more preferably 85 to 100 mol %. When the hydrogenation rate is 80 mol % or more, there is a tendency that the weather resistance is more improved. Incidentally, the hydrogenation rate can be calculated by measuring $^1$H-NMR of each of the block copolymer (P) and the hydrogenated block copolymer (A) after the hydrogenation.

[Softening Agent (B)]

The kind of the softening agent (B) that is used in the present invention is not particularly limited, and for example, a known softening agent that is used for rubbers, plastics, and the like, a known softening agent that is used in combination with a polyvinyl acetal resin, and the like may be used.

Examples of the known softening agent that is used for rubbers, plastics, and the like include paraffin-based, naphthene-based, and aromatic process oils; phthalic acid derivatives, such as dioctyl phthalate, dibutyl phthalate, etc.; white oils; mineral oils; liquid co-oligomers of ethylene and an α-olefin; liquid paraffins; polybutene; low-molecular weight polyisobutylene; liquid polydienes, such as liquid polybutadiene, liquid polyisoprene, a liquid polyisoprene/butadiene copolymer, a liquid styrene/butadiene copolymer, a liquid styrene/isoprene copolymer, etc.; and hydrogenated products thereof; and the like. Above all, paraffin-based process oils; liquid co-oligomers of ethylene and an α-olefin; and liquid paraffins are preferred from the viewpoint of compatibility with the hydrogenated block copolymer (A).

Examples of the known softening agent that is used in combination with a polyvinyl acetal resin include organic acid ester-based plasticizers, such as monobasic organic acid esters, polybasic organic acid esters, etc.; phosphoric acid-based plasticizers, such as organic phosphoric acid esters, organic phosphorous acid esters, etc.; and the like.

Examples of the monobasic organic acid ester include glycol-based esters obtained by reaction of a glycol, such as triethylene glycol, tetraethylene glycol, tripropylene glycol, etc., and a monobasic organic acid, such as butyric acid, isobutyric acid, caproic acid, 2-ethylbutyric acid, hepthylic acid, n-octylic acid, 2-ethylhexylic acid, pelargonic acid (n-nonylic acid), decylic acid, etc., which are represented by triethylene glycol-dicaproic acid ester, triethylene glycol-di-2-ethylbutyric acid ester, triethylene glycol-di-n-octylic acid ester, triethylene glycol-di-2-ethylhexylic acid ester, and the like.

Examples of the polybasic organic acid ester include esters of a polybasic organic acid, such as adipic acid, sebacic acid, azelaic acid, etc., and a linear or branched alcohol, which are represented by dibutyl sebacate, dioctyl azelate, dibutylcarbinol adipate, and the like.

Examples of the organic phosphoric acid ester include tributoxyethyl phosphate, isodecylphenyl phosphate, triisopropyl phosphate, and the like.

The softening agent (B) may be used alone or in combination of any two or more thereof.

In the thermoplastic elastomer composition of the present invention, a content of the softening agent (B) is 20 to 2,000 parts by mass on the basis of 100 parts by mass of the hydrogenated block copolymer (A). When the content of the softening agent (B) falls outside the foregoing range, a thermoplastic elastomer composition that is excellent in all of flexibility, molding processability, weather resistance, and rubber elasticity cannot be obtained. From such viewpoint, the content of the softening agent (B) is preferably 25 to 1,000 parts by mass, and more preferably 25 to 500 parts by mass on the basis of 100 parts by mass of the hydrogenated block copolymer (A).

[Polyolefin-Based Resin (C)]

The thermoplastic elastomer composition of the present invention may include, in addition to the hydrogenated block copolymer (A) and the softening agent (B) as described above, a polyolefin-based resin (C), if desired. The kind of the polyolefin-based resin (C) that may be used is not particularly limited, and conventionally already-known olefin-based polymers may be used. Preferred examples thereof include polyethylene, polypropylene, polybutene-1, polyhexene-1, poly-3-methyl-butene-1, poly-4-methyl-pentene-1, copolymers of ethylene and one or two or more α-olefins having 3 to 20 carbon atoms (for example, propylene, 1-butene, 1-pentene, 1-hexene, 1-heptene, 1-octene, 1-decene, 3-methyl-1-butene, 4-methyl-1-pentene, 6-methyl-1-heptene, isooctene, isooctadiene, decadiene, etc.), an ethylene/propylene/diene copolymer (EPDM), an ethylene-vinyl acetate copolymer, an ethylene-acrylic acid copolymer, and the like. Of those, polypropylene-based resins, such as homopolypropylene, random polypropylene, block polypropylene, etc.; and polyethylene-based resins, such as high-density polyethylene (HDPE), low-density polyethylene (LDPE), linear low-density polyethylene (LLDPE), etc. are preferred, with polypropylene-based resins being more preferred. The polyolefin-based resin (C) may be used alone or in combination of any two or more thereof.

In the case where the thermoplastic elastomer composition of the present invention includes the polyolefin-based resin (C), its content is preferably 5 to 200 parts by mass on the basis of 100 parts by mass of the hydrogenated block copolymer (A). So long as the content of the polyolefin-based resin (C) falls within the foregoing range, the flexibility, molding processability, weather resistance, and rubber elasticity of the resulting thermoplastic elastomer composition are more improved. From such viewpoint, the content of the polyolefin-based resin (C) is preferably 10 to 150 parts by mass, and more preferably 20 to 100 parts by mass on the basis of 100 parts by mass of the hydrogenated block copolymer (A).

A total content of the hydrogenated block copolymer (A) and the softening agent (B) in the thermoplastic elastomer composition is preferably 50% by mass or more, more preferably 60% by mass or more, still more preferably 70% by mass or more, and yet still more preferably 75% by mass or more from the viewpoint of obtaining a thermoplastic elastomer composition that is excellent in all of flexibility, molding processability, weather resistance, and rubber elasticity. In addition, in the case where the thermoplastic elastomer composition of the present invention includes the polyolefin-based resin (C), a total content of the hydrogenated block copolymer (A), the softening agent (B), and the polyolefin-based resin (C) is preferably 50% by mass or more, more preferably 80% by mass or more, still more preferably 90% by mass or more, and yet still more preferably 95% by mass or more.

The thermoplastic elastomer composition of the present invention may further include a tackifier resin, if desired. Examples of such a tackifier resin include aliphatic unsaturated hydrocarbons, aliphatic saturated hydrocarbon resins, alicyclic unsaturated hydrocarbon resins, alicyclic saturated hydrocarbon resins, aromatic hydrocarbon resins, hydrogenated aromatic hydrocarbon resins, rosin ester resins, hydrogenated rosin ester resins, terpene phenol resins, hydrogenated terpene phenol resins, terpene resins, hydrogenated terpene resins, aromatic hydrocarbon modified terpene resins, coumarone.indene resins, phenol resins, xylene resins, and the like. The tackifier resin may be used alone or in combination of any two or more thereof.

Furthermore, to the thermoplastic elastomer composition of the present invention, inorganic fillers or other additives, for example, a thermal-anti-aging agent, an antioxidant, a photostabilizer, an antistatic agent, a mold releasing agent, a flame retardant, a foaming agent, a pigment, a dye, a whitening agent, etc., may be added within the range where the effects of the present invention are not hindered. Specific examples of the inorganic filler include talc, calcium carbonate, silica, a glass fiber, a carbon fiber, mica, kaolin, titanium oxide, and the like. Of those, talc is preferred.

In accordance with the aforementioned thermoplastic elastomer composition, a molded body having a desired hardness may be produced by adjusting its formulation.

For example, an embodiment of the thermoplastic elastomer composition falling within the scope of the present invention is concerned with a thermoplastic elastomer composition in which the content of the softening agent (B) is 20 parts by mass or more and less than 200 parts by mass on the basis of 100 parts by mass of the hydrogenated block copolymer (A).

In accordance with the thermoplastic elastomer composition according to this embodiment, a molded body having such an appropriate hardness that the type A hardness measured in conformity with JIS K6253-3 is more than 10, or the Asker C hardness measured in conformity with JIS K6253-3 is more than 30, may be obtained.

In the thermoplastic elastomer composition according to this embodiment, the content of the softening agent (B) is preferably 20 to 150 parts by mass, more preferably 20 to 100 parts by mass, and still more preferably 25 to 80 parts by mass on the basis of 100 parts by mass of the hydrogenated block copolymer (A) from the viewpoint of obtaining a molded body having an appropriate hardness and a high oil retention rate.

In addition, it is preferred that the thermoplastic elastomer composition according to this embodiment further includes the polyolefin-based resin (C) from the viewpoint of improving the molding processability. The content of the polyolefin-based resin (C) is preferably 5 to 200 parts by mass on the basis of 100 parts by mass of the hydrogenated block copolymer (A). When the content of the polyolefin-based resin (C) is 5 parts by mass or more, the molding processability is improved, whereas when it is 200 parts by mass or less, the resulting thermoplastic elastomer composition is excellent in flexibility and rubber elasticity. From such viewpoint, the content of the polyolefin-based resin (C) is more preferably 10 to 150 parts by mass, still more preferably 20 to 100 parts by mass, and yet still more preferably 20 to 60 parts by mass on the basis of 100 parts by mass of the hydrogenated block copolymer (A).

In addition, for example, another embodiment of the thermoplastic elastomer composition falling within the scope of the present invention is concerned with a thermoplastic elastomer composition in which the content of the softening agent (B) is 200 to 2,000 parts by mass on the basis of 100 parts by mass of the hydrogenated block copolymer (A), and the Asker C hardness measured in conformity with JIS K6253-3 is 30 or less.

In accordance with the thermoplastic elastomer composition according to this embodiment, a molded body having conspicuously excellent flexibility may be obtained. In addition, the instant thermoplastic elastomer composition uses, as the hydrogenated block copolymer, the hydrogenated block polymer (A) having the constitutional unit (b1) derived from farnesene, and therefore, as compared with thermoplastic elastomer compositions using other hydrogenated block polymer, a molded body having equal flexibility can be obtained at a smaller content of the softening agent (B). For that reason, dissolution of the hydrogenated block copolymer (A) in a large amount of the softening agent is inhibited, and the solid state may be kept. As a result, a molded body not only having excellent flexibility but also keeping the solid state may be obtained. In addition, in accordance with the thermoplastic elastomer composition according to this another embodiment, conspicuous flexibility can be obtained while suppressing the content of the softening agent (B) in the resulting molded body. Thus, a bleeding of the softening agent (B) may be controlled low, and the resulting molded body is improved in terms of not only an oil retention rate but also rubber elasticity.

In the thermoplastic elastomer composition according to this embodiment, the content of the softening agent (B) is more preferably 200 to 1,500 parts by mass, still more preferably 200 to 1,000 parts by mass, and yet still more preferably 200 to 500 parts by mass on the basis of 100 parts by mass of the hydrogenated block copolymer (A) from the viewpoint of obtaining a thermoplastic elastomer composition that is not only high in flexibility and oil retention rate but also excellent in molding processability, weather resistance, and rubber elasticity.

The total content of the hydrogenated block copolymer (A) and the softening agent (B) in the thermoplastic elastomer composition according to this embodiment is preferably 90% by mass or more, more preferably 95% by mass or more, and still more preferably 99% by mass or more from the viewpoint of obtaining a thermoplastic elastomer composition that is excellent in all of flexibility, molding processability, weather resistance, and rubber elasticity.

In addition, in the thermoplastic elastomer composition according to this another embodiment, the content of the polyolefin-based resin (C) is preferably 100 parts by mass or less, more preferably 50 parts by mass or less, still more preferably less than 20 parts by mass, and yet still more preferably 10 parts by mass or less on the basis of 100 parts by mass of the hydrogenated block copolymer (A) from the viewpoint of improving the resulting molded body in terms of flexibility and rubber elasticity. Even yet still more preferably, the thermoplastic elastomer composition does not include the polyolefin-based resin (C).

[Production Method of Thermoplastic Elastomer Composition]

A production method of the thermoplastic elastomer composition of the present invention is not particularly limited, and examples thereof include various conventional production methods. For example, the thermoplastic elastomer composition may be suitably produced by dry blending the hydrogenated block copolymer (A), the softening agent (B), and other components to be used, if desired and then melt kneading the contents using a kneading machine, such as a single-screw extruder, a twin-screw extruder, a kneader, a Banbury mixer, a roller, etc.

[2] Molded Body

The molded body of the present invention includes the thermoplastic elastomer composition of the present invention. A shape of the molded body may be any shape so long as it may be produced by using the thermoplastic elastomer composition of the present invention. For example, the thermoplastic elastomer composition of the present invention may be molded in various shapes, such as a pellet, a film, a sheet, a plate, a pipe, a tube, a rod-like body, a granular body, etc. A production method of this molded body is not particularly limited, and the thermoplastic elastomer composition of the present invention may be molded by various conventional molding methods, for example, injection molding, blow molding, press molding, extrusion molding, calender molding, etc. The thermoplastic elastomer composition of the present invention is excellent in molding processability, and therefore, a molded body may be suitably obtained by injection molding with high cycle.

[3] Application of Thermoplastic Elastomer Composition and Molded Body

The thermoplastic elastomer composition and the molded body of the present invention are excellent in all of flexibility, molding processability, weather resistance, and rubber elasticity, and therefore, they may be suitably used as molded articles, such as a pressure-sensitive adhesive, a sheet, a film, a tube, a hose, a belt, etc. Specifically, the thermoplastic elastomer composition and the molded body of the present invention may be suitably used for pressure-sensitive adhesive materials, such as a hot melt adhesive, a pressure-sensitive adhesive tape, a pressure-sensitive adhesive layer of protective film, etc.; various vibration absorbing or damping members, such as damping rubber, a mat, a sheet, a cushion, a damper, a pad, a mount rubber, etc.; footwear, such as sport shoes, fashion sandals, etc.; consumer electronics members, such as a television set, a stereo audio set, a cleaner, a refrigerator, etc.; building materials, such as a packing used for sealing door or window frames of building, etc.; automobile interior or exterior components, such as a bumper component, a body panel, a weather strip, a grommet, a skin material of instrument panel, etc., an air-bag cover, etc.; grip members of scissors, a screwdriver, a toothbrush, poles for skiing, and the like; food wrapping materials, such as a wrapping film for foods, etc.; medical devices, such as an infusion solution bag, a syringe, a catheter, etc.; stoppers and cap liners for a container for storing foods, beverages, drugs, and the like; and so on.

EXAMPLES

The present invention is hereunder described by reference to Examples, but it should not be construed that the present invention is limited to these Examples. Incidentally, β-farnesene (purity: 97.6 weight %, manufactured by Amyris, Inc.) was purified using a 3-angstrom molecular sieve and distilled under a nitrogen atmosphere to remove hydrocarbon-based impurities, such as zingiberene, bisabolene, farnesene epoxide, farnesol isomers, E,E-farnesol, squalene, ergosterol, several kinds of dimers of farnesene, etc., therefrom, and the thus purified β-farnesene was used in the following polymerization.

(1) Measurement Method of Molecular Weight Distribution and Peak Top Molecular Weight (Mp)

A peak top molecular weight (Mp) of the styrene block and a peak top molecular weight (Mp) and a molecular weight distribution (Mw/Mn) of the hydrogenated block copolymer were determined by GPC (gel permeation chromatography) in terms of a molecular weight of polystyrene as a reference standard substance. The peak top molecular weight (Mp) was determined from a position of a peak top of the molecular weight distribution. Measuring devices and conditions are as follows.

Device: GPC device "GPC8020", manufactured by Tosoh Corporation
Separation column: "TSKgelG4000HXL", manufactured by Tosoh Corporation
Detector: "RI-8020", manufactured by Tosoh Corporation
Eluent: Tetrahydrofuran
Eluent flow rate: 1.0 mL/min
Sample concentration: 5 mg/10 mL
Column temperature: 40° C.

(2) Measurement Method of Hydrogenation Rate

In each of the Examples and Comparative Examples, the block copolymer (P) and the hydrogenated block copolymer (A) after the hydrogenation were respectively dissolved in a deuterated chloroform solvent, and each of the resulting solutions was subjected to $^1$H-NMR measurement at 50° C. using "Lambda-500", manufactured by JOEL Ltd. A hydrogenation rate of the polymer block (b) in the hydrogenated block copolymer (A) was calculated from the peak of protons contained in carbon-carbon double bonds observed in the range of from 4.5 to 6.0 ppm in the resulting spectrum, according to the following formula.

Hydrogenation rate={1−(Molar number of carbon-carbon double bonds contained per mol of hydrogenated block copolymer (A))/(Molar number of carbon-carbon double bonds contained per mol of block copolymer (P)}×100 (mol %)

(3) Measurement Method of Melt Flow Rate (MFR)

(3-1) MFR (at 200° C. and 98 N)

The thermoplastic elastomer composition obtained in each of the Examples and Comparative Examples was measured using a melt indexer L244 (manufactured by Technol Seven Co., Ltd.) under conditions at 200° C. and 98 N from a nozzle having a dimension of 2.095 mm in diameter×8.00 mm in length. Incidentally, the higher the MFR value, the more excellent the molding processability is.

(3-2) MFR (at 160° C. and 49 N)

The thermoplastic elastomer composition obtained in each of the Examples and Comparative Examples was measured using a melt indexer L244 (manufactured by Technol Seven Co., Ltd.) under conditions at 160° C. and 49 N from a nozzle having a dimension of 2.095 mm in diameter×8.00 mm in length. Incidentally, the higher the MFR value, the more excellent the molding processability is.

(4) Measurement Method of Hardness (4-1) Type A Hardness

A sheet (molded body) (length: 150 mm, width: 150 mm, thickness: 1 mm) was obtained by subjecting the thermoplastic elastomer composition obtained in each of the Examples and Comparative Examples to compression molding at 200° C. and 1.0 MPa for 3 minutes. This sheet was measured using an indenter of a type A durometer in conformity with JIS K6253-3. Incidentally, the lower the hardness, the more excellent the flexibility is.

(4-2) Asker C Hardness

A sheet prepared by the same method as that in the above item (4-1) was measured using an indenter of an Asker rubber durometer C type, manufactured by Kobunshi Keiki Co., Ltd. in conformity with JIS K7312. Incidentally, the lower the hardness, the more excellent the flexibility is.

(4-3) Shore OO Hardness

A sheet prepared by the same method as that in the above item (4-1) was measured using an indenter of a type OO durometer in conformity with ASTM D2240. Incidentally, the lower the hardness, the more excellent the flexibility is.

(5) Measurement Method of Compression Set (at 23° C. for 22 hours)

A columnar test piece having a diameter of 13.0±0.5 mm and a thickness of 6.3±0.3 mm (d0) was prepared by subjecting the thermoplastic elastomer composition obtained in each of the Examples and Comparative Examples to compression molding at 200° C. for 3 minutes. In conformity with JIS K6262, this columnar test piece was subjected to 25% compression deformation using a space having a thickness of 4.8 mm (d1) and maintained under an atmosphere at 23° C. for 22 hours, followed by releasing the compression. Thereafter, the resultant was allowed to stand under an atmosphere at 23° C. and at a relative humidity of 50% for 30 minutes, and a thickness (d2: mm) of the resulting columnar test piece was measured, from which was determined a compression set (%) (=100×(d0−d2)/(d0−d1)). The lower the numerical value, the more excellent the rubber elasticity is.

(6) Measurement Method of Compression Set (at 70° C. for 22 hours)

A compression set was measured in the same manner as that in the above item (5), except for changing the temperature at the time of compression to 70° C. The lower the numerical value, the more excellent the rubber elasticity is.

(7) Measurement Method of Compression Set (at 40° C. for 22 hours)

A compression set was measured in the same manner as that in the above item (5), except for changing the temperature at the time of compression to 40° C. The lower the numerical value, the more excellent the rubber elasticity is.

(8) Measurement Method of Weather Resistance

A sheet (molded body) (length: 150 mm, width: 150 mm, thickness: 1 mm) was obtained by carrying out the same operations as those in the above item (4). This sheet was allowed to stand under an atmosphere at a temperature of 200° C. for 60 minutes. Any change of color before and after standing was observed by visual inspection and finger touch and evaluated according to the following criteria.

1: No change is observed.
2: Yellowing is slightly observed.
3: Yellowing is observed.
4: Yellowing is vigorous, and an increase of tackiness of the sheet surface is observed.

(9) Oil Retention Rate

A sheet (molded body) (length: 150 mm, width: 150 mm, thickness: 1 mm) was obtained by carrying out the same operations as those in the above item (4). A columnar test piece having a diameter of 40 mm was punched out from this sheet, and its weight (w1) was weighed. This columnar test piece was sandwiched by quantitative filter papers (No. 5C) and allowed to stand under an atmosphere at 23° C. and at a relative humidity of 50% for 168 hours. Thereafter, the filter papers were removed, and a weight (w2) of the resulting columnar test piece was weighed, from which was determined an oil retention rate (%) (=100×w2/w1).

<Hydrogenated Block Copolymers (A) and (A)'>

Production Example 1

A pressure reaction vessel having been purged with nitrogen and dried was charged with 50.0 kg of cyclohexane as a solvent and 36.9 g of sec-butyllithium (10.5% by mass cyclohexane solution) (3.9 g of sec-butyllithium) as an anionic polymerization initiator. After raising the temperature to 50° C., 1.87 kg of styrene (1) was added, and the contents were polymerized for one hour. Subsequently, 8.75 kg of β-farnesene was added, and the contents were polymerized for two hours. Furthermore, 1.87 kg of styrene (2) was added, and the contents were polymerized for one hour, thereby obtaining a reaction solution containing a polystyrene-poly(β-farnesene)-polystyrene triblock copolymer. To this reaction solution, palladium carbon (amount of palladium supported: 5% by mass) was added as a hydrogenation catalyst in an amount of 5% by mass on the basis of the block copolymer, and the contents were allowed to react under conditions at a hydrogen pressure of 2 MPa and 150°

C. for 10 hours. After allowing the reaction mixture to stand for cooling and releasing the pressure, the palladium carbon was removed by means of filtration, and the filtrate was concentrated and further dried in vacuo, thereby obtaining a hydrogenated product of the polystyrene-poly(β-farnesene)-polystyrene triblock copolymer (hereinafter referred to as "hydrogenated block copolymer (I)-1"). The hydrogenated block copolymer (I)-1 was subjected to the aforementioned evaluations. The results are shown in Table 1.

Incidentally, as for the peak top molecular weight (Mp) of the styrene block in the hydrogenated block copolymer (I)-1, a measured value of the peak top molecular weight (Mp) of polystyrene obtained by polymerizing the styrene (1) and then sampling in the process of polymerizing the polystyrene-poly(β-farnesene)-polystyrene triblock copolymer was defined as the peak top molecular weight (Mp) of the styrene block in the hydrogenated block copolymer (1)-1.

Production Examples 2 to 8, 11 to 13, 15 to 16, and 19

Hydrogenated block copolymers (I)-2 to (I)-8, (I')-11 to (I')-13, (I')-15 to (I')-16, and (I')-19 were produced in the same procedures as those in Production Example 1, except for following the formulations as shown in Table 1, respectively. The resulting hydrogenated block copolymers (I)-2 to (I)-8, (I')-11 to (I')-13, and (I')-15 to (I')-16 were subjected to the aforementioned evaluations. The results are shown in Tables 1 and 2.

Production Examples 9 and 10

Hydrogenated block copolymers (I)-9 and (I')-10 were produced in the same procedures as those in Production Example 1, except for following the formulations as shown in Tables 1 and 2, respectively while changing the hydrogenation reaction time to 4 hours for the hydrogenated block copolymer (I)-9 and changing the hydrogenation reaction time to 2 hours for the hydrogenated block copolymer (I')-10, respectively. The resulting hydrogenated block copolymers (I)-9 and (I')-10 were subjected to the aforementioned evaluations. The results are shown in Tables 1 and 2.

Production Examples 14, 17, and 18

Hydrogenated block copolymers (I')-14, (I')-17, and (I')-18 were produced in the same procedures as those in Production Example 1, except for following the formulations of the respective components as shown in Table 2 while using a mixed solvent obtained by mixing 50.0 kg of cyclohexane with 72 g of tetrahydrofuran for the hydrogenated block copolymer (I')-14, using a mixed solvent obtained by mixing 50.0 kg of cyclohexane with 288 g of tetrahydrofuran for the hydrogenated block copolymer (I')-17, and using a mixed solvent obtained by mixing 50.0 kg of cyclohexane with 103 g of tetrahydrofuran for the hydrogenated block copolymer (I')-18, respectively. The resulting hydrogenated block copolymers (I')-14, (I')-17, and (I')-18 were subjected to the aforementioned evaluations. The results are shown in Table 2.

TABLE 1

| | Production Example | | | | |
|---|---|---|---|---|---|
| | 1 | 2 | 3 | 4 | 5 |
| Hydrogenated copolymer | (I)-1 | (I)-2 | (I)-3 | (I)-4 | (I)-5 |
| Use amount [kg] | | | | | |
| Cyclohexane | 50.0 | 50.0 | 50.0 | 50.0 | 50.0 |
| sec-BuLi cyclohexane solution (10.5% by mass) | 0.0369 | 0.0155 | 0.0413 | 0.0299 | 0.0212 |
| Styrene (1) | 1.87 | 1.32 | 1.12 | 2.21 | 1.32 |
| Styrene (2) | 1.87 | 1.32 | 1.12 | 2.21 | 1.32 |
| β-Farnesene | 8.75 | 6.18 | 10.25 | 4.41 | 3.09 |
| Isoprene | | | | | 3.09 |
| Butadiene | | | | | |
| Tetrahydrofuran | | | | | |
| (a)/(b) [mass ratio] (*1) | 30/70 | 30/70 | 18/82 | 50/50 | 30/70 |
| (b1)/(b) [% by mass] (*2) | 100 | 100 | 100 | 100 | 50 |
| Polymer skeleton (*3) | St-F-St | St-F-St | St-F-St | St-F-St | St-(F/Ip)-St |
| Physical properties | | | | | |
| Peak top molecular weight (Mp) of styrene block | 31,000 | 52,000 | 16,600 | 45,000 | 38,000 |
| Peak top molecular weight (Mp) of hydrogenated block copolymer | 222,000 | 373,400 | 200,500 | 189,000 | 327,000 |
| Molecular weight distribution (Mw/Mn) | 1.13 | 1.40 | 1.23 | 1.25 | 1.14 |
| Hydrogenation rate (%) (*4) | 91.0 | 90.2 | 93.2 | 95.5 | 98.0 |

| | Production Example | | | |
|---|---|---|---|---|
| | 6 | 7 | 8 | 9 |
| Hydrogenated copolymer | (I)-6 | (I)-7 | (I)-8 | (I)-9 |
| Use amount [kg] | | | | |
| Cyclohexane | 50.0 | 50.0 | 50.0 | 50.0 |
| sec-BuLi cyclohexane solution (10.5% by mass) | 0.8340 | 0.0230 | 0.0922 | 0.0369 |
| Styrene (1) | 1.87 | 1.32 | 1.87 | 1.87 |
| Styrene (2) | 1.87 | 1.32 | 1.87 | 1.87 |
| β-Farnesene | 4.37 | 3.44 | 4.88 | 8.75 |
| Isoprene | 4.37 | | | |

TABLE 1-continued

|  | | | | |
|---|---|---|---|---|
| Butadiene | | 2.73 | 3.87 | |
| Tetrahydrofuran | | | | |
| (a)/(b) [mass ratio] (*1) | 30/70 | 30/70 | 30/70 | 30/70 |
| (b1)/(b) [% by mass] (*2) | 50 | 56 | 56 | 100 |
| Polymer skeleton (*3) | St-(F/Ip)-St | St-(F/Bd)-St | St-(F/Bd)-St | St-F-St |
| Physical properties | | | | |
| Peak top molecular weight (Mp) of styrene block | 13,700 | 35,000 | 12,400 | 31,000 |
| Peak top molecular weight (Mp) of hydrogenated block copolymer | 117,000 | 350,000 | 123,000 | 218,000 |
| Molecular weight distribution (Mw/Mn) | 1.06 | 1.15 | 1.04 | 1.15 |
| Hydrogenation rate (%) (*4) | 98.1 | 98.2 | 98.5 | 74.7 |

(*1) (a)/(b) represents a mass ratio of the total amount of the constitutional unit (a) to the total amount of the constitutional unit (b).
(*2) (b1)/(b) represents a content of the constitutional unit (b1) derived from farnesene in the polymer block (b).
(*3) St-F-St represents a polystyrene-poly(β-farnesene)-polystyrene triblock copolymer. St-(F/Ip)-St represents a polystyrene-poly(β-farnesene/isoprene)-polystyrene triblock copolymer. St-(F/Bd)-St represents a polystyrene-poly(β-farnesene/butadiene)-polystyrene triblock copolymer. St-(Ip/Bd)-St represents a polystyrene-poly(isoprene/butadiene)-polystyrene triblock copolymer. St-Bd-St represents a polystyrene-polybutadiene-polystyrene triblock copolymer. St-Ip-St represents a polystyrene-polyisoprene-polystyrene triblock copolymer.
(*4) The hydrogenation rate represents a hydrogenation rate of carbon-carbon double bonds in the constitutional unit (b) derived from a conjugated diene.

TABLE 2

| | Production Example | | | | |
|---|---|---|---|---|---|
| | 10 | 11 | 12 | 13 | 14 |
| Hydrogenated copolymer | (I')-10 | (I')-11 | (I')-12 | (I')-13 | (I')-14 |
| Use amount [kg] | | | | | |
| Cyclohexane | 50.0 | 50.0 | 50.0 | 50.0 | 50.0 |
| sec-BuLi cyclohexane solution (10.5% by mass) | 0.0369 | 0.0169 | 0.1812 | 0.2512 | 0.1633 |
| Styrene (1) | 1.87 | 2.22 | 1.66 | 3.21 | 1.87 |
| Styrene (2) | 1.87 | 2.22 | 1.66 | 3.21 | 1.87 |
| β-Farnesene | 8.75 | 1.11 | | | |
| Isoprene | | | 15.16 | 15.00 | |
| Butadiene | | | | | 8.75 |
| Tetrahydrofuran | | | | | 0.072 |
| (a)/(b) [mass ratio] (*5) | 30/70 | 80/20 | 18/72 | 30/70 | 30/70 |
| (b1)/(b)[% by mass] (*6) | 100 | 100 | 0 | 0 | 0 |
| Polymer skeleton (*7) | St-F-St | St-F-St | St-Ip-St | St-Ip-St | St-Bd-St |
| Physical properties | | | | | |
| Peak top molecular weight (Mp) of styrene block | 31,000 | 80,000 | 5,600 | 7,800 | 7,000 |
| Peak top molecular weight (Mp) of hydrogenated block copolymer | 222,000 | 203,000 | 89,200 | 71,200 | 76,900 |
| Molecular weight distribution (Mw/Mn) | 1.10 | 1.26 | 1.03 | 1.03 | 1.13 |
| Hydrogenation rate (%) (*8) | 45.0 | 95.6 | 99.0 | 99.1 | 99.0 |

| | Production Example | | | | |
|---|---|---|---|---|---|
| | 15 | 16 | 17 | 18 | 19 |
| Hydrogenated copolymer | (I')-15 | (I')-16 | (I')-17 | (I')-18 | (I')-19 |
| Use amount [kg] | | | | | |
| Cyclohexane | 50.0 | 50.0 | 50,0 | 50.0 | 50.0 |
| sec-BuLi cyclohexane solution (10.5% by mass) | 0.1394 | 0.0310 | 0.1254 | 0.0313 | 0.0293 |
| Styrene (1) | 1.87 | 1.32 | 1.67 | 1.50 | 1.54 |
| Styrene (2) | 1.87 | 1.32 | 1.67 | 1.50 | 1.54 |
| β-Farnesene | | | | | |
| Isoprene | 4.88 | 3.44 | 13.33 | | 5.73 |
| Butadiene | 3.87 | 2.73 | | 5.81 | |
| Tetrahydrofuran | | | 0.288 | 0.103 | |
| (a)/(b) [mass ratio] (*5) | 30/70 | 30/70 | 20/80 | 35/65 | 35/65 |
| (b1)/(b)[% by mass] (*6) | 0 | 0 | 0 | 0 | 0 |
| Polymer skeleton (*7) | St-(Ip/Bd)-St | St-(Ip/Bd)-St | St-Ip-St | St-Bd-St | St-Ip-St |
| Physical properties | | | | | |
| Peak top molecular weight (Mp) of styrene block | 8,200 | 26,000 | 8,100 | 30,000 | 33,000 |
| Peak top molecular weight (Mp) of hydrogenated block copolymer | 82,500 | 262,000 | 115,000 | 274,000 | 263,000 |

TABLE 2-continued

| | | | | | |
|---|---|---|---|---|---|
| Molecular weight distribution (Mw/Mn) | 1.06 | 1.06 | 1.07 | 1.06 | 1.06 |
| Hydrogenation rate (%) (*8) | 97.8 | 97.8 | 85.1 | 99.3 | 99.1 |

(*5) (a)/(b) represents a mass ratio of the total amount of the constitutional unit (a) to the total amount of the constitutional unit (b).
(*6) (b1)/(b) represents a content of the constitutional unit (b1) derived from farnesene in the polymer block (b).
(*7) St-F-St represents a polystyrene-poly(β-farnesene)-polystyrene triblock copolymer. St-(F/Ip)-St represents a polystyrene-poly(β-farnesene/isoprene)-polystyrene triblock copolymer. St-(F/Bd)-St represents a polystyrene-poly(β-farnesene/butadiene)-polystyrene triblock copolymer. St-(IP/Bd)-St represents a polystyrene-poly(isoprene/butadiene)-polystyrene triblock copolymer. St-Bd-St represents a polystyrene-polybutadiene-polystyrene triblock copolymer. St-Ip-St represents a polystyrene-polyisoprene-polystyrene triblock copolymer.
(*8) The hydrogenation rate represents a hydrogenation rate of carbon-carbon double bonds in the constitutional unit (b) derived from a conjugated diene.

<Softening Agent (B)>
  Softening agent-1: DIANA PROCESS PW-90 (hydrogenated paraffin-based oil), kinetic viscosity: 95 mm$^2$/s (at 40° C.) (manufactured by Idemitsu Kosan Co., Ltd.)
  Softening agent-2: DIANA PROCESS PW-32 (hydrogenated paraffin-based oil), kinetic viscosity: 31 mm$^2$/s (at 40° C.) (manufactured by Idemitsu Kosan Co., Ltd.)
<Polyolefin-Based Resin (C)>
  Homopolypropylene: J106, MFR=18 g/10 min [at 230° C. and 21 N] (manufactured by Prime Polymer Co., Ltd.)
  Random polypropylene: F327, MFR=7.0 g/10 min [at 230° C. and 21 N] (manufactured by Prime Polymer Co., Ltd.)
  Block polypropylene: J707G, MFR=30 g/10 min [at 230° C. and 21 N] (manufactured by Prime Polymer Co., Ltd.)
  HDPE: NOVATEC HB112R, MFR=0.04 g/10 min [at 190° C. and 21 N] (manufactured by Japan Polypropylene Corporation)
  LLDPE: ULT-ZEX 2022L, MFR=2.0 g/10 min [at 190° C. and 21 N] (manufactured by Prime Polymer Co., Ltd.)

Examples 1 to 16 and Comparative Examples 1 to 22

As the hydrogenated block copolymer (A) or (A)', each of the aforementioned hydrogenated block copolymers (I)-1 to (I)-9 and (I)-10 to (I')-17 was used; the hydrogenated block copolymer (A) or (A)' and the aforementioned softening agent (B) and polyolefin-based resin (C) were dry blended in each of the formulations shown in Tables 3 to 6; the contents were melt kneaded using a twin-screw extruder ("TEX-44XCT", manufactured by The Japan Steel Works, Ltd.) at a cylinder temperature of 200° C. and a screw rotation rate of 200 rpm; and the resultant was extruded in a strand form, which was then cut to obtain a thermoplastic elastomer composition. The resulting thermoplastic elastomer compositions were subjected to the aforementioned evaluations. The results are shown in Tables 3 to 6.

TABLE 3

| | | Example | | | | | | | | | | Comparative Example | | |
|---|---|---|---|---|---|---|---|---|---|---|---|---|---|---|
| | | 1 | 2 | 3 | 4 | 5 | 6 | 7 | 8 | 9 | 10 | 1 | 2 | 3 |
| Thermoplastic polymer composition | | | | | | | | | | | | | | |
| (A) | Hydrogenated copolymer (I)-1 | 100 | 100 | 100 | 100 | | | | | | | | | |
| | Hydrogenated copolymer (I)-2 | | | | | 100 | | | | | | | | |
| | Hydrogenated copolymer (I)-3 | | | | | | 100 | | | | | | | |
| | Hydrogenated copolymer (I)-4 | | | | | | | 100 | | | | | | |
| | Hydrogenated copolymer (I)-6 | | | | | | | | 100 | | | | | |
| | Hydrogenated copolymer (I)-8 | | | | | | | | | 100 | | | | |
| | Hydrogenated copolymer (I)-9 | | | | | | | | | | 100 | | | |
| (A)' | Hydrogenated copolymer (I')-10 | | | | | | | | | | | 100 | 100 | 100 |
| | Hydrogenated copolymer (I')-11 | | | | | | | | | | | | | |
| | Hydrogenated copolymer (I')-12 | | | | | | | | | | | | | |
| | Hydrogenated copolymer (I')-13 | | | | | | | | | | | | | |
| | Hydrogenated copolymer (I')-14 | | | | | | | | | | | | | |
| | Hydrogenated copolymer (I')-15 | | | | | | | | | | | | | |
| | Hydrogenated copolymer (I')-16 | | | | | | | | | | | | | |
| | Hydrogenated copolymer (I')-17 | | | | | | | | | | | | | |
| (B) | Softening agent-1 (*9) | 30 | 30 | 50 | 50 | 50 | 50 | 50 | 50 | 50 | 50 | 20 | 50 | 50 |
| (C) | Homopolypropylene | | 20 | 20 | 40 | 20 | 20 | 20 | 20 | 20 | 20 | 20 | 20 | 40 |
| Evaluation results | | | | | | | | | | | | | | | |
| | MFR [at 200° C. and 49 N] (g/10 min) | 10 | 13 | 69 | 76 | 82 | 115 | 69 | 22 | 13 | 73 | 13 | 83 | 80 |
| | Hardness [type A] | 16 | 28 | 22 | 57 | 20 | 18 | 58 | 58 | 59 | 22 | 33 | 24 | 59 |
| | Compression set [at 23° C. for 22 hours] (%) | 4 | 8 | 8 | 16 | 8 | 4 | 25 | 13 | 21 | 10 | 12 | 10 | 19 |
| | Compression set [at 70° C. for 22 hours] (%) | 18 | 25 | 20 | 37 | 20 | 66 | 87 | 89 | 86 | 23 | 27 | 23 | 40 |
| | Weather resistance | 1 | 1 | 1 | 1 | 1 | 1 | 1 | 1 | 1 | 2 | 4 | 4 | 4 |

TABLE 3-continued

| | | Comparative Example | | | | | | | | | | | |
|---|---|---|---|---|---|---|---|---|---|---|---|---|---|
| | | 4 | 5 | 6 | 7 | 8 | 9 | 10 | 11 | 12 | 13 | 14 | 15 |
| Thermoplastic polymer composition | | | | | | | | | | | | | |
| (A) | Hydrogenated copolymer (I)-1 | | | | | | | | | | | 100 | 100 |
| | Hydrogenated copolymer (I)-2 | | | | | | | | | | | | |
| | Hydrogenated copolymer (I)-3 | | | | | | | | | | | | |
| | Hydrogenated copolymer (I)-4 | | | | | | | | | | | | |
| | Hydrogenated copolymer (I)-6 | | | | | | | | | | | | |
| | Hydrogenated copolymer (I)-8 | | | | | | | | | | | | |
| | Hydrogenated copolymer (I)-9 | | | | | | | | | | | | |
| (A)' | Hydrogenated copolymer (I')-10 | | | | | | | | | | | | |
| | Hydrogenated copolymer (I')-11 | 100 | | | | | | | | | | | |
| | Hydrogenated copolymer (I')-12 | | 100 | | | | | | | | | | |
| | Hydrogenated copolymer (I')-13 | | | 100 | 100 | 100 | 100 | | | | | | |
| | Hydrogenated copolymer (I')-14 | | | | | | | 100 | | | | | |
| | Hydrogenated copolymer (I')-15 | | | | | | | | 100 | | | | |
| | Hydrogenated copolymer (I')-16 | | | | | | | | | 100 | | | |
| | Hydrogenated copolymer (I')-17 | | | | | | | | | | 100 | | |
| (B) | Softening agent-1 (*9) | 50 | 50 | 30 | 20 | 50 | 50 | 50 | 50 | 50 | 50 | | 15 |
| (C) | Homopolypropylene | 20 | 20 | | 20 | 20 | 40 | 20 | 20 | 20 | 20 | | 40 |
| Evaluation results | | | | | | | | | | | | | |
| | MFR [at 200° C. and 49 N] (g/10 min) | 83 | >500 | 2.5 | 9.4 | 67 | 58 | 26 | 9.7 | no flow | >500 | no flow | 6.5 |
| | Hardness [type A] | 97 | 47 | 70 | 71 | 67 | 67 | 68 | 67 | 62 | 34 | 22 | 65 |
| | Compression set [at 23° C. for 22 hours] (%) | 85 | 41 | 18 | 18 | 24 | 23 | 19 | 18 | 12 | 12 | 5 | 20 |
| | Compression set [at 70° C. for 22 hours] (%) | 100 | 100 | 100 | 100 | 100 | 100 | 100 | 100 | 30 | 100 | 20 | 42 |
| | Weather resistance | 1 | 1 | 1 | 1 | 1 | 1 | 1 | 1 | 1 | 3 | 1 | 1 |

(*9) Softening agent-1: DIANA PROCESS PW-90 (hydrogenated paraffin-based oil), kinetic viscosity: 95 mm$^2$/s (at 40° C.), manufactured by Idemitsu Kosan Co., Ltd.

TABLE 4

| | | Example | Comparative Example | |
|---|---|---|---|---|
| | | 11 | 16 | 17 |
| Thermoplastic polymer composition | | | | |
| (A) | Hydrogenated copolymer (I)-5 | 100 | | |
| (A)' | Hydrogenated copolymer (I')-10 | | 100 | |
| | Hydrogenated copolymer (I')-16 | | | 100 |
| (B) | Softening agent-1 (*9) | 100 | 100 | 100 |
| (C) | Homopolypropylene | 20 | 20 | 20 |
| Evaluation results | | | | |
| MFR [at 200° C. and 49 N] (g/10 min) | | 8.0 | 11 | 0.3 |
| Hardness [type A] | | 23 | 15 | 43 |
| Compression set [at 23° C. for 22 hours] (%) | | 11 | 13 | 9 |
| Compression set [at 70° C. for 22 hours] (%) | | 23 | 23 | 19 |
| Weather resistance | | 1 | 3 | 1 |

(*9) Softening agent-1: DIANA PROCESS PW-90 (hydrogenated paraffin-based oil), kinetic viscosity: 95 mm$^2$/s (at 40° C.), manufactured by Idemitsu Kosan Co., Ltd.

TABLE 5

| | | Example | Comparative Example |
|---|---|---|---|
| | | 12 | 18 |
| Thermoplastic polymer composition | | | |
| (A) | Hydrogenated copolymer (I)-7 | 100 | |
| (A)' | Hydrogenated copolymer (I')-16 | | 100 |
| (B) | Softening agent-1 (*9) | 150 | 150 |
| (C) | Homopolypropylene | 40 | 40 |
| Evaluation results | | | |
| MFR [at 200° C. and 49 N] (g/10 min) | | 93 | 26 |
| Hardness [type A] | | 48 | 55 |
| Compression set [at 23° C. for 22 hours] (%) | | 15 | 16 |
| Compression set [at 70° C. for 22 hours] (%) | | 32 | 34 |
| Weather resistance | | 1 | 1 |

(*9) Softening agent-1: DIANA PROCESS PW-90 (hydrogenated paraffin-based oil), kinetic viscosity: 95 mm$^2$/s (at 40° C.), manufactured by Idemitsu Kosan Co., Ltd.

TABLE 6

| | | Example | | | | Comparative Example | | | |
|---|---|---|---|---|---|---|---|---|---|
| | | 13 | 14 | 15 | 16 | 19 | 20 | 21 | 22 |
| Thermoplastic polymer composition | | | | | | | | | |
| (A) | Hydrogenated copolymer (I)-1 | 100 | 100 | 100 | 100 | | | | |
| (A)' | Hydrogenated copolymer (I')-13 | | | | | 100 | 100 | 100 | 100 |
| (B) | Softening agent-1 (*9) | 50 | 50 | 50 | 50 | 50 | 50 | 50 | 50 |
| (C) | Random polypropylene | 20 | | | | 20 | | | |
| | Block polypropylene | | 20 | | | | 20 | | |
| | HDPE | | | 20 | | | | 20 | |
| | LLDPE | | | | 20 | | | | 20 |

TABLE 6-continued

|  | Example | | | | Comparative Example | | | |
| --- | --- | --- | --- | --- | --- | --- | --- | --- |
|  | 13 | 14 | 15 | 16 | 19 | 20 | 21 | 22 |
| Evaluation results | | | | | | | | |
| MFR [at 200° C. and 49 N] (g/10 min) | 16 | 34 | 74 | 17 | 13 | 29 | 65 | 14 |
| Hardness [type A] | 19 | 18 | 19 | 18 | 29 | 26 | 29 | 28 |
| Compression set [at 23° C. for 22 hours] (%) | 9 | 8 | 9 | 12 | 18 | 18 | 19 | 21 |
| Compression set [at 70° C. for 22 hours] (%) | 28 | 25 | 26 | 29 | 100 | 100 | 100 | 100 |
| Weather resistance | 1 | 1 | 1 | 1 | 1 | 1 | 1 | 1 |

(*9) Softening agent-1: DIANA PROCESS PW-90 (hydrogenated paraffin-based oil), kinetic viscosity: 95 mm²/s (at 40° C.), manufactured by Idemitsu Kosan Co., Ltd

Examples 17 to 23 and Comparative Examples 23 to 30

As the hydrogenated block copolymer (A) or (A)', each of hydrogenated block copolymers shown in Tables 7 and 8 was used. The hydrogenated block copolymer (A) or (A)' and the aforementioned softening agent (B) were preliminarily mixed in each of the formulations shown in Tables 7 and 8 by using SUPERMIXER "SMV-100" (manufactured by Kawata Manufacturing Co., Ltd.). Subsequently, the contents were melt kneaded using a twin-screw extruder ("TEX-44XCT", manufactured by The Japan Steel Works, Ltd.) at a cylinder temperature of 200° C. and a screw rotation rate of 200 rpm, and the resultant was extruded in a strand form, which was then cut to obtain a thermoplastic elastomer composition. The resulting thermoplastic elastomer compositions were subjected to the aforementioned evaluations. The results are shown in Tables 7 and 8.

TABLE 7

|  |  | Example | | | | | Comparative Example | | | |
| --- | --- | --- | --- | --- | --- | --- | --- | --- | --- | --- |
|  |  | 17 | 18 | 19 | 20 | 21 | 23 | 24 | 25 | 26 |
| Thermoplastic polymer composition | | | | | | | | | | |
| (A) | Hydrogenated copolymer (I)-1 | 100 | | | | | | | | |
|  | Hydrogenated copolymer (I)-2 | | 100 | | | | | | | |
|  | Hydrogenated copolymer (I)-3 | | | 100 | | | | | | |
|  | Hydrogenated copolymer (I)-5 | | | | 100 | | | | | |
|  | Hydrogenated copolymer (I)-7 | | | | | 100 | | | | |
| (A)' | Hydrogenated copolymer (I')-15 | | | | | | 100 | | | |
|  | Hydrogenated copolymer (I')-16 | | | | | | | 100 | | |
|  | Hydrogenated copolymer (I')-18 | | | | | | | | 100 | |
|  | Hydrogenated copolymer (I')-19 | | | | | | | | | 100 |
| (B) | Softening agent-2 (*10) | 200 | 200 | 200 | 400 | 450 | 1000 | 600 | 600 | 600 |
|  | Hardness [Asker C] | 11 | 7 | 12 | 11 | 10 | 10 | 12 | 11 | 12 |
| Evaluation results | | | | | | | | | | |
| MFR [at 160° C. and 49 N] (g/10 min) | | 71 | 68 | >500 | 85 | 76 | >500 | 33 | 27 | 31 |
| Hardness [Shore OO] | | 10 | <5 | 12 | 11 | 13 | 9 | 12 | 11 | 12 |
| Compression set [at 40° C. for 22 hours] (%) | | 12 | 6 | 80 | 16 | 18 | 100 | 25 | 27 | 30 |
| Weather resistance | | 1 | 1 | 1 | 1 | 1 | 1 | 1 | 1 | 1 |
| Oil retention rate [at 23° C. for 168 hours] (%) | | 97.6 | 97.3 | 98.1 | 96.3 | 96.5 | 59.6 | 85.3 | 83.3 | 82.5 |

(*10) Softening agent-2: DIANA PROCESS PW-32 (hydrogenated paraffin-based oil), kinetic viscosity: 31 mm²/s (at 40° C.), manufactured by Idemitsu Kosan Co., Ltd

TABLE 8

|  |  | Example 17 | Example 22 | Example 23 | Comparative Example 27 | Comparative Example 28 | Comparative Example 29 | Comparative Example 30 |
| --- | --- | --- | --- | --- | --- | --- | --- | --- |
| Thermoplastic polymer composition | | | | | | | | |
| (A) | Hydrogenated copolymer (I)-1 | 100 | 100 | 100 | 100 | | | |
| (A)' | Hydrogenated copolymer (I')-16 | | | | | 100 | 100 | 100 |
| (B) | Softening agent-2 (*10) | 200 | 400 | 1000 | 2500 | 200 | 400 | 1000 |
|  | Hardness [Asker C] | 11 | 8 | <5 | Unmeasurable | 36 | 19 | 10 |
| Evaluation results | | | | | | | | |
| MFR [at 200° C. and 49 N] (g/10 min) | | 71 | >500 | >500 | Unmeasurable | no flow | 3 | 120 |
| Hardness [Shore OO] | | 10 | <5 | <5 | Unmeasurable | 57 | 32 | 10 |
| Weather resistance | | 1 | 1 | 1 | Unmeasurable | 1 | 1 | 1 |

(*10) Softening agent-2: DIANA PROCESS PW-32 (hydrogenated paraffin-based oil), kinetic viscosity: 31 mm²/s (at 40° C.), manufactured by Idemitsu Kosan Co., Ltd.

It is noted from Tables 3 to 6 that the thermoplastic elastomer compositions of Examples 1 to 16 are excellent in all of flexibility, molding processability, weather resistance, and rubber elasticity (compression set).

On the other hand, as for the thermoplastic elastomer compositions of Comparative Examples 1 to 3 and 16, the hydrogenation rate thereof relative to the hydrogenated block copolymer (A)' is low as 45.0%, and hence, they are inferior in weather resistance.

As for the thermoplastic elastomer composition of Comparative Example 4, the mass ratio of the polymer block (a) and the polymer block (b) [(a)/(b)] of the hydrogenated block copolymer (A)' is 80/20, a value of which falls outside the scope of the present invention, and hence, they are high in hardness and inferior in flexibility, and are also inferior in rubber elasticity (compression set).

As for the thermoplastic elastomer compositions of Comparative Examples 5 to 11 and 13, the hydrogenated block copolymer (A)' does not have the constitutional unit (b1) derived from farnesene, and hence, they are high in compression set at especially high temperatures and inferior in rubber elasticity.

As for the thermoplastic elastomer composition of Comparative Example 12, the hydrogenated block copolymer (A)' does not have the constitutional unit (b1) derived from farnesene, and hence, though it is good in rubber elasticity, it is poor in flow ability and inferior in molding processability.

The thermoplastic elastomer composition of Comparative Example 14 does not contain the softening agent (B), it is poor in flow ability and inferior in molding processability.

As for the thermoplastic elastomer composition of Comparative Example 15, the content of the softening agent (B) falls outside the scope of the present invention, and hence, it is poor in flow ability and inferior in molding processability, and also, it is high in hardness and inferior in flexibility.

As for the thermoplastic elastomer compositions of Comparative Examples 17 and 18, the hydrogenated block copolymer (A)' does not have the constitutional unit (b1) derived from farnesene, and hence, they are poor in flow ability and inferior in molding processability, and also they are high in hardness and inferior in flexibility, as compared with those of Examples 11 and 12 having the same compounding ratios, respectively.

As for the thermoplastic elastomer compositions of Comparative Examples 19 to 22, the hydrogenated block copolymer (A)' does not have the constitutional unit (b1) derived from farnesene, and hence, they are high in compression set at especially high temperatures and inferior in rubber elasticity, as compared with those of Examples 13 to 16 having the same compounding ratios, respectively.

In addition, in Table 7, as for the thermoplastic elastomer compositions of Examples 17 to 21 and Comparative Examples 23 to 26, the Asker C hardness is in the range of from 7 to 12, and hence, they are substantially equal in the Asker C hardness. In addition, the thermoplastic elastomer compositions of Examples 17 to 21 are smaller in the content of the softening agent, as compared with the thermoplastic elastomer compositions of Comparative Examples 23 to 26. Thus, the thermoplastic elastomer compositions of Examples 17 to 21 have the constitutional unit (b1) derived from farnesene as the conjugated diene-derived constitutional unit of the hydrogenated copolymer (A), and hence, they are able to realize a low hardness in a smaller content of the softening agent, as compared with the thermoplastic elastomer compositions of Comparative Examples 23 to 26 not containing the polymer having the constitutional unit (b1). For that reason, the thermoplastic elastomer compositions of Examples 17 to 21 are excellent in oil retention rate, as compared with the thermoplastic elastomer compositions of Comparative Examples 23 to 26. In addition, the thermoplastic elastomer compositions of Examples 17 to 21 are excellent in all of flexibility, molding processability, weather resistance, and rubber elasticity (compression set).

Furthermore, in Table 8, as is clear from comparison between Example 17 and Comparative Example 28, comparison between Example 22 and Comparative Example 29, and comparison between Example 23 and Comparative Example 30, in the case where the content of the softening agent is identical, the thermoplastic elastomer compositions of Examples 17, 22, and 23 are lower in hardness and more excellent in flexibility, and higher in MFR and more excellent in flow ability than the thermoplastic elastomer compositions of Comparative Examples 28 to 30.

In Table 8, in Comparative Example 27, the content of the softening agent-2 is so high as 2,500 parts by mass, the thermoplastic polymer composition was a liquid in which the polymer was melted in the softening agent. For that reason, in the measurement of MFR, the thermoplastic polymer composition could not be filled in the cylinder, and the measurement was impossible.

The invention claimed is:

1. A thermoplastic elastomer composition comprising a hydrogenated block copolymer (A) and a softening agent (B),
    the hydrogenated block copolymer (A) being a hydrogenated product of a block copolymer including a polymer block (a) composed of a constitutional unit derived from an aromatic vinyl compound and a polymer block (b) containing 30 to 100% by mass of a constitutional unit (b1) derived from farnesene and 70 to 0% by mass of a constitutional unit (b2) derived from a conjugated diene other than farnesene,
    a mass ratio of the polymer block (a) and the polymer block (b) [(a)/(b)] being 10/90 to 60/40,
    70 to 100 mol % of carbon-carbon double bonds in the polymer block (b) being hydrogenated, and
    a content of the softening agent (B) being 20 to 200 parts by mass on the basis of 100 parts by mass of the hydrogenated block copolymer (A),
    wherein
    the aromatic vinyl compound comprises at least one selected from the group consisting of styrene, α-methylstyrene and 4-methylstyrene,
    the conjugated diene other than farnesene comprises at least one selected from the group consisting of butadiene, isoprene and myrcene, and
    the softening agent (B) comprises at least one selected from the group consisting of paraffin-based process oils, naphthene-based process oils and aromatic process oils, phthalic acid derivatives, white oils, liquid co-oligomers of ethylene and an α-olefin, liquid paraffins, low-molecular weight polyisobutylene, liquid polydienes, and hydrogenated products thereof.

2. The thermoplastic elastomer composition according to claim 1, wherein the thermoplastic elastomer composition further comprises a polyolefin-based resin (C), and a content of the polyolefin-based resin (C) is 5 to 200 parts by mass on the basis of 100 parts by mass of the hydrogenated block copolymer (A).

3. The thermoplastic elastomer according to claim 1, wherein a total content of the hydrogenated block copolymer (A) and the softening agent (B) in the thermoplastic elastomer composition is 90% by mass or more.

4. The thermoplastic elastomer composition according to claim 1, wherein the farnesene is β-farnesene.

5. The thermoplastic elastomer composition according to claim 1, wherein a peak top molecular weight (Mp) of the hydrogenated block copolymer (A) is 4,000 to 1,500,000.

6. The thermoplastic elastomer composition according to claim 1, wherein a molecular weight distribution (Mw/Mn) of the hydrogenated block copolymer (A) is 1 to 4.

7. The thermoplastic elastomer composition according to claim 1, wherein the aromatic vinyl compound is styrene.

8. The thermoplastic elastomer composition according to claim 1, wherein the hydrogenated block copolymer (A) is a hydrogenated product of a block copolymer including at least two of the polymer blocks (a) and at least one of the polymer blocks (b).

9. A molded body comprising the thermoplastic elastomer composition according to claim 1.

10. The thermoplastic elastomer composition according to claim 1, wherein the content of the softening agent (B) is 50 to 200 parts by mass on the basis of 100 parts by mass of the hydrogenated block copolymer (A).

* * * * *